United States Patent
Senzaki et al.

(10) Patent No.: US 9,501,711 B2
(45) Date of Patent: Nov. 22, 2016

(54) IMAGE PROCESSING METHOD AND IMAGE PROCESSING DEVICE WITH CORRECTION OF PIXEL STATISTICAL VALUES TO REDUCE RANDOM NOISE

(71) Applicant: NEC Corporation, Tokyo (JP)

(72) Inventors: Kenta Senzaki, Tokyo (JP); Masato Tsukada, Tokyo (JP); Hiroaki Kawaguchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 131 days.

(21) Appl. No.: 14/397,037

(22) PCT Filed: Apr. 24, 2013

(86) PCT No.: PCT/JP2013/061969
§ 371 (c)(1),
(2) Date: Oct. 24, 2014

(87) PCT Pub. No.: WO2013/161839
PCT Pub. Date: Oct. 31, 2013

(65) Prior Publication Data
US 2015/0098656 A1    Apr. 9, 2015

(30) Foreign Application Priority Data
Apr. 26, 2012 (JP) ................... 2012-100910

(51) Int. Cl.
*G06K 9/40* (2006.01)
*G09G 1/14* (2006.01)
(Continued)

(52) U.S. Cl.
CPC ............ *G06K 9/4604* (2013.01); *G06K 9/52* (2013.01); *G06T 5/002* (2013.01); *G06T 5/20* (2013.01); *G06T 2207/20016* (2013.01); *G06T 2207/20182* (2013.01); *G06T 2207/20192* (2013.01)

(58) Field of Classification Search
None
See application file for complete search history.

(56) References Cited

U.S. PATENT DOCUMENTS

| | | |
|---|---|---|
| 7,151,858 B2 | 12/2006 | Kyong |
| 8,059,910 B2* | 11/2011 | Ishiga ............... G06T 5/10 382/260 |

(Continued)

FOREIGN PATENT DOCUMENTS

| | | |
|---|---|---|
| CN | 1427617 | 7/2003 |
| JP | 2002-057900 | 2/2002 |

(Continued)

OTHER PUBLICATIONS

International Search Report, PCT/JP2013/061969, Jul. 16, 2013.
(Continued)

*Primary Examiner* — Randolph I Chu
(74) *Attorney, Agent, or Firm* — Young & Thompson (57) ABSTRACT

The present invention is a method including: correcting difference between a pixel statistical value of a specific layer and a pixel statistical value of a layer that is wider than the specific layer using an edge information of a layer that is wider than the specific layer; correcting the pixel statistical value of the specific layer using post-correction difference and the pixel statistical value of layer that is wider than the specific layer; recorrecting the post-correction pixel statistical value of the specific layer using difference between a pre-correction pixel statistical value of the specific layer and the post-correction pixel statistical value of the specific layer and the edge information of a layer that is wider than the specific layer; and correcting the target pixel by repeating correction and recorrection until the layer reduces its range from the maximum range to the minimum range.

19 Claims, 6 Drawing Sheets

(51) Int. Cl.

| | | |
|---|---|---|
| *G09G 3/28* | (2013.01) | |
| *G09G 3/30* | (2006.01) | |
| *G09G 5/00* | (2006.01) | |
| *G09G 5/02* | (2006.01) | |
| *G09G 5/10* | (2006.01) | |
| *G06K 9/46* | (2006.01) | |
| *G06T 5/00* | (2006.01) | |
| *G06T 5/20* | (2006.01) | |
| *G06K 9/52* | (2006.01) | |

(56) References Cited

U.S. PATENT DOCUMENTS

| | | | | |
|---|---|---|---|---|
| 8,351,735 B2* | 1/2013 | Biezen | ............... | H04N 1/4072 |
| | | | | 382/260 |
| 2002/0076118 A1 | 6/2002 | Kaji | | |
| 2014/0056536 A1* | 2/2014 | Zamyatin | ............... | G06T 5/002 |
| | | | | 382/260 |
| 2014/0205202 A1* | 7/2014 | Toda | ............... | H04N 1/409 |
| | | | | 382/275 |
| 2015/0086130 A1* | 3/2015 | Senzaki | ............... | G06T 5/002 |
| | | | | 382/266 |
| 2015/0098656 A1* | 4/2015 | Senzaki | ............... | G06T 5/002 |
| | | | | 382/194 |
| 2015/0363666 A1* | 12/2015 | Senzaki | ............... | H04N 1/409 |
| | | | | 382/199 |

FOREIGN PATENT DOCUMENTS

| | | |
|---|---|---|
| JP | 2002-183727 | 6/2002 |
| JP | 2007-018379 | 1/2007 |
| JP | 2011-041183 | 2/2011 |

OTHER PUBLICATIONS

Chinese Office Action dated May 5, 2016 in corresponding Chinese Patent Application No. 201380021821.7.

Claudio Rosito Jung et al., Adaptive image denoising and edge enhancement in scale-space using the wavelet tranform, Pattern Recognition Letters, Elsevier, vol. 24, No. 7, Apr. 2003, pp. 965-971.

* cited by examiner

IMAGE PROCESSING METHOD AND IMAGE PROCESSING DEVICE WITH CORRECTION OF PIXEL STATISTICAL VALUES TO REDUCE RANDOM NOISE

TECHNICAL FIELD

The present invention relates to an image processing method and an image processing device.

BACKGROUND ART

In the image processing technology, specifically, a technology for reducing random noise contained in an image is essential to sharp reproduction of a captured image. A typical technology for reducing random noise is disclosed in Patent Literature 1.

Patent Literature 1 discloses the following technology. That is, an apparatus includes a plurality of arithmetic circuits for calculating a moving average pixel number (n) based on a specified mathematical formula with respect to an arbitrary target pixel (i) in a main scanning direction of a color digital signal output from an input image processing circuit, a plurality of bit selector circuits for selectively outputting the target pixel (i) and reference pixels (j) preceding and following (n) pixels, a plurality of difference circuits for calculating absolute values of the differences between an output level of the target pixel (i) and an output level of each of the reference pixels (j), a plurality of judging circuits for outputting the target pixel (i), comparing the values output from the plurality of difference circuits with a specified threshold in a threshold memory, to output the reference pixels (j) based on the comparison result, and a plurality of arithmetic circuits for performing the moving average processing of output signals from the plurality of judging circuits.

More specifically, only in a case where an absolute value of a difference between an output level of the target pixel (i) and an output level of the reference pixel (j) is equal to or less than a threshold, the reference pixel (j) is added to the moving average processing. As a result, a portion where the absolute value of the difference varies sharply over the threshold is excluded from the moving average processing. This ensures effective removal of noise components.

CITATION LIST

Patent Literature

[Patent Literature 1]
Japanese Unexamined Patent Application, First Publication No. 2002-57900

SUMMARY OF INVENTION

Technical Problem

However, with the technology of the Patent Literature 1, it was impossible to remove low frequency noise with periodicity equal to or more than a size of a smoothing filter.

Specifically, it was impossible to realize both of the preservation of edge components and texture components in an image and effective removal of noise from an image at the same time.

In the light of the above, the present invention was made to solve the above described problem. A purpose of the present invention is to provide an image processing method capable of preserving edge components and texture components in an image as well as effectively removing noise from the image and an image processing device.

Solution to Problem

The present invention is directed to an image processing method including: calculating a pixel statistical value and edge information of pixels for each of areas of a multi-layer, the areas each containing a target pixel and having a successively decreased range; correcting difference information between a pixel statistical value of an area of a specific layer and a pixel statistical value of an area of a layer that is wider than the area of the specific layer using the edge information; correcting the pixel statistical value of the area of the specific layer using post-correction difference information and the pixel statistical value of the area that is wider than the area of the specific layer; recorrecting difference information between a pre-correction pixel statistical value of the area of the specific layer and a post-correction pixel statistical value of the area of the specific layer using the edge information; and correcting the target pixel by repeating correction and recorrection of the pixel statistical value of the area of the specific layer successively in each layer until the area reduces its range from the maximum range to the minimum range.

The present invention is directed to an image processing device including: a pixel statistical value calculation unit calculating a pixel statistical value of pixels for each of areas of a multi-layer, the areas each containing a target pixel and having a successively decreased range; an edge information calculation unit calculating edge information for each of the areas of the multi-layer, the areas each containing a target pixel and having a successively decreased range; and a correction unit correcting a pixel statistical value of an area of a specific layer using post-correction difference information and a pixel statistical value of an area that is wider than the area of the specific layer, recorrecting difference information between a pre-correction pixel statistical value of the area of the specific layer and a post-correction pixel statistical value of the area of the specific layer using the edge information, and correcting the target pixel by repeating correction and recorrection of the pixel statistical value of the area of the specific layer successively in each layer until the area reduces its range from the maximum range to the minimum range.

Advantageous Effect of Invention

According to an aspect of the present invention, it is possible to remove noise effectively.

DESCRIPTION OF EMBODIMENTS

An embodiment of the present invention will be described below.

Figure 1:
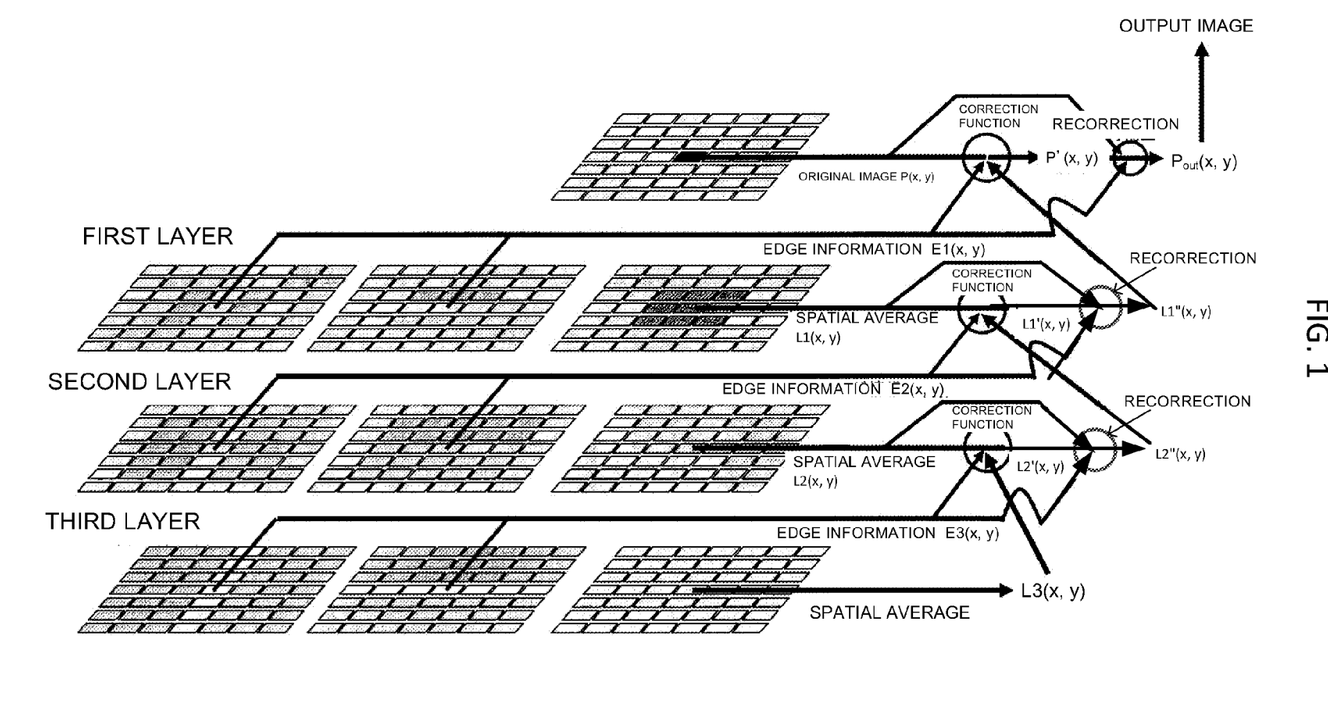
FIG. 1 illustrates an image processing method according to an embodiment of the present invention.

FIG. 1 illustrates an image processing method according to the embodiment of the present invention. FIG. 1 illustrates a flow of multi-resolution image processing carried out in a three-layer structure. However, it is possible to achieve the present invention by multi-resolution image processing carried out in a two-layer structure. It is further possible to achieve the present invention by multi-resolution image processing carried out in a four-or-more-layer structure with ease.

FIG. 1 illustrates the image processing method according to an embodiment of the present invention.

According to the embodiment of the present invention, a spatial average (L2 (x, y)) in an medium area is corrected using a spatial average L3 (x, y) as a pixel statistical value of a space in a wide area and edge information in the wide area or an edge amount E3 (x, y) of the wide area, the wide area including a pixel location (x, y) (target pixel) at a center thereof. Further, the L2 (x, y) is recorrected in such a manner that a signal is extracted based on the E3 (x, y) from a difference value R2 (x, y) between the L2 (x, y) and a post-correction spatial average (L2' (x, y)) in an medium area, and thus extracted signal is synthesized with the L2' (x, y) to thereby recorrect the L2 (x, y). Then, a spatial average (L1 (x, y)) of a narrow area is corrected using a re-correction spatial average (L2" (x, y)) in the medium area and an edge amount (E2 (x, y)) in the medium area. A sequential processing of the correction ensures correction of an input pixel value $P_{in}$ (x, y) and obtainment of an output pixel value $P_{out}$ (x, y).

Here, the pixel statistical value is a spatial average of a target area. Examples of the spatial average include an arithmetic mean, a geometric mean, and a weighted average efficiency of pixels existing in areas. Given that the pixel statistical value is a spatial average, in the following description, a case where the spatial average is the arithmetic mean of pixels in areas will be described below. Further, the edge amount or the edge information is to be defined by a difference value of the statistic amounts (e.g., mean values and medians) of pixels between areas, the pixels being respectively positioned upward, downward, left-side, and right-side of the target pixel (input pixel). In the following description, similar to the pixel statistical value, a case where the edge amount is a difference between the spatial averages will be described.

A specific processing will be described below. In FIG. 1, flows of processing at respective layers are identical to each other except for the parameter for calculating a correction amount. As an example, processing for correcting the spatial average L2 (x, y) in the medium area will be described below in detail using the spatial average L3 (x, y) in the wide area and the edge amount E3 (x, y) in the wide area.

Initially, the spatial average L3 (x, y) of the wide area (range between −k3 and k3) and the spatial average L2 (x, y) of the medium area (range between −k2 and k2) at each pixel location (x, y) are calculated according to a formula (1) and a formula (2), respectively. Here, a range of each of the wide area and the medium area is designated by the respective same pixel numbers in a vertical axis and a horizontal axis, i.e., designated by k3 and k2, respectively. However, the pixel numbers are not necessarily the same in the vertical axis and the horizontal axis.

$$L3(x, y) = \frac{1}{(2 \cdot k3 + 1)^2} \sum_{i=-k3}^{k3} \sum_{j=-k3}^{k3} P_{in}(x+i, y+j) \quad (1)$$

$$L2(x, y) = \frac{1}{(2 \cdot k2 + 1)^2} \sum_{i=-k2}^{k2} \sum_{j=-k2}^{k2} P_{in}(x+i, y+j) \quad (2)$$

Next, the edge amount E3 (x, y) in the wide area will be calculated. In the calculation of the edge amount, an edge amount EV3 (x, y) in the vertical direction and an edge amount EH3 (x, y) in the horizontal direction are calculated according to a formula (3) and a formula (4), respectively. Resulting values are added according to a formula (5) to obtain the edge amount E3 (x, y) in the wide area. Here, the range of the wide area is designated by the same pixel numbers, e.g., k3, in the vertical axis and the horizontal axis. However, it is not essential to designate the range by the same pixel numbers in the vertical axis and the horizontal axis.

$$EV3(x, y) = \quad (3)$$
$$\frac{1}{(2 \cdot k3 + 1) \cdot k3} \left| \sum_{i=-k3}^{k3} \sum_{j=1}^{k3} (P_{in}(x+i, y+j) - P_{in}(x+i, y-j)) \right|$$

$$EH3(x, y) = \quad (4)$$
$$\frac{1}{(2 \cdot k3 + 1) \cdot k3} \left| \sum_{i=1}^{k3} \sum_{j=-k3}^{k3} (P_{in}(x+i, y+j) - P_{in}(x-i, y+j)) \right|$$

$$E3(x, y) = EV3(x, y) + EH3(x, y) \quad (5)$$

Subsequently, the spatial average L3 (x, y) in the wide area is corrected according to a formula (6) using a composed weight α3 (x, y) that is calculated from thus calculated edge amount E3 (x, y) to obtain a post-correction spatial average L3' (x, y) in the wide area. The composed weight α3 (x, y) is calculated according to a formula (7) using preliminary set thresholds hi3 and lo3.

$$L3'(x, y) = (1 - \alpha 3(x, y)) \cdot L3(x, y) + \alpha 3(x, y) \cdot L2(x, y) \quad (6)$$

$$\alpha 3(x, y) = \begin{cases} 1.0 & \text{if } E3(x, y) > hi3 \\ 0.0 & \text{else if } E3(x, y) < lo3 \\ \frac{E3(x, y) - lo3}{hi3 - lo3} & \text{else} \end{cases} \quad (7)$$

Finally, the post-correction spatial average L3' is used to correct the spatial average L2 (x, y) of the medium area according to a formula (8).

$$L2'(x,y) = L3'(x,y) + \text{Func}(L2(x,y) - L3'(x,y)) \quad (8)$$

Figure 2:
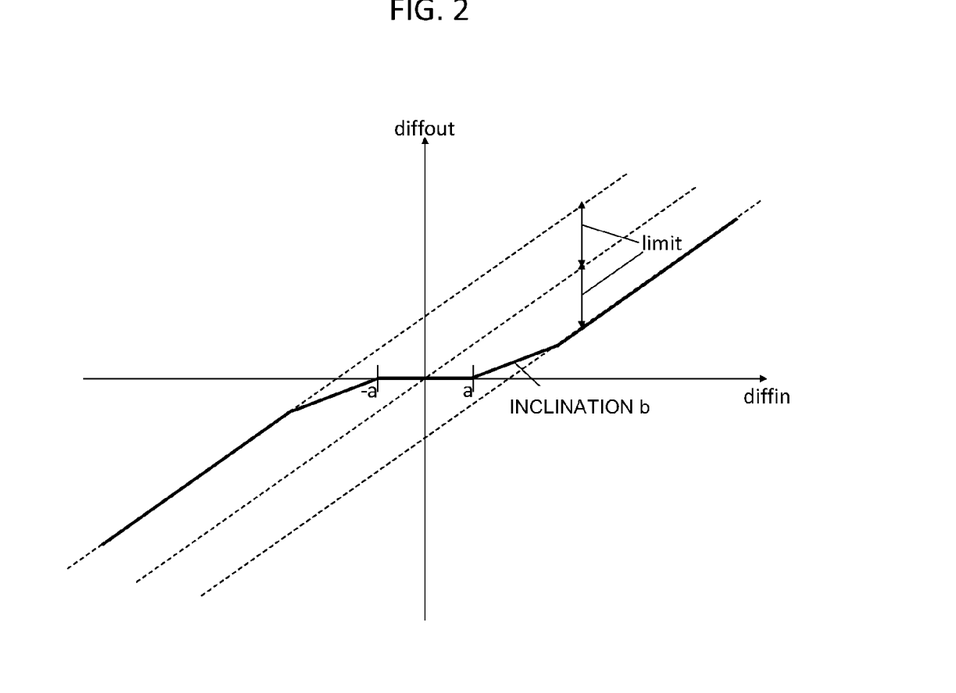
FIG. 2 illustrates an example of the Func function.

The Func function of FIG. 2 is used as an example of a correction function Func. For example, correction of the spatial average L2 (x, y) of the medium area at the pixel location (x, y) is executed in such a manner that a correction amount diffout obtainable by the correction function of FIG. 2 is added to the L2 (x, y), provided that diffin is set to (L2 (x, y)−L3" (x, y)). Parameters a, b, and limit in the correction function of FIG. 2 are decided for each resolution to be processed and for each color component to be corrected.

The edge amount E3 (x, y) calculated for each layer according to the formula (5) is reflected to the Func function (correction function) that suppresses noise components to thereby vary the Func function (correction function) at each layer. This ensures adaptive suppression of the noise components at each layer.

Now, a coefficient β3 (x, y) that varies according to the edge amount E3 (x, y) in a manner as shown in a formula (9) will be defined. The thresholds hi3 and lo3 of the E3 (x, y) are preliminary set.

$$\beta 3(x, y) = \begin{cases} 0.0 & \text{if } E3(x, y) > hi3 \\ 1.0 & \text{else if } E3(x, y) < lo3 \\ \frac{E3(x, y) - lo3}{hi3 - lo3} & \text{else} \end{cases} \quad (9)$$

Figure 3:
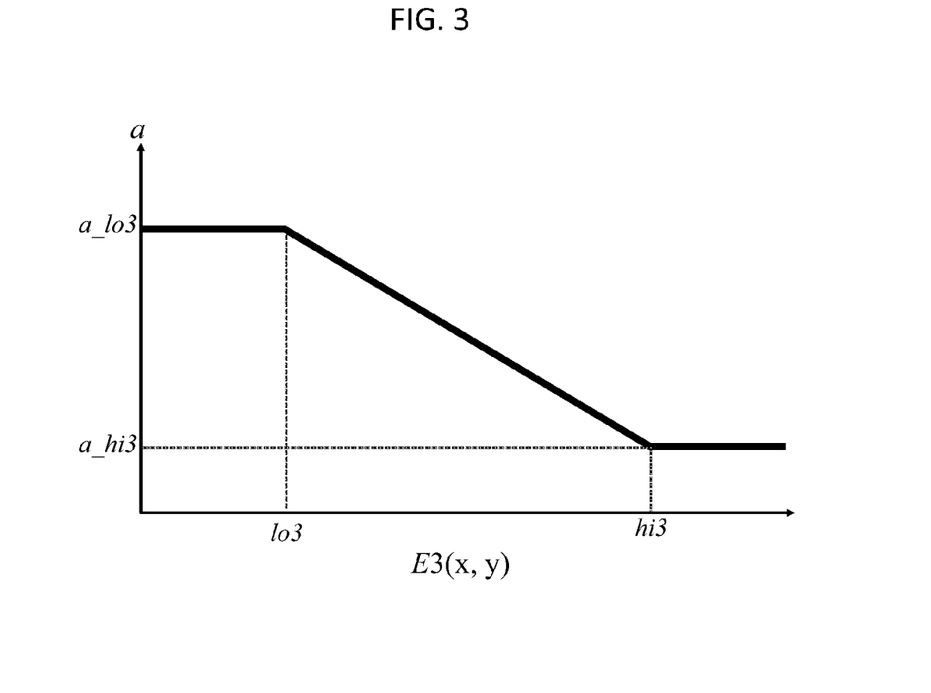
FIG. 3 illustrates an exemplary setting of a parameter (a) in a wide area.

The coefficient β3 (x, y) defined according to the formula (9) is a real number within a range between 0 and 1.0. The coefficient β3 (x, y) is used to set the parameter (a) in the Func function according to the following formula (10). A relationship between the edge amount E3 (x, y) and the parameter (a) is illustrated in FIG. 3.

$$a = \beta(x,y) \times a\_lo3 + (1 - \beta(x,y)) \times a\_hi3 \quad (10)$$

Here, a_lo3 is a value to be used as the parameter (a) when the edge amount E3 (x, y) is smaller than the threshold lo3, and a_hi3 is a value to be used for the parameter (a) when the edge amount is larger than the threshold hi3. As far as the edge amount E3 (x, y) is within a range between the thresholds lo3 and hi3, the parameter (a) becomes a value falls within a range between a_hi3 and a_lo3. Here, a_hi3 is a real number equal to or more than 0, and a_lo3 is a real number satisfying a_lo3>=a_hi3.

Thus obtained Func function is used to correct the spatial average L2 (x, y) of the medium area according to a formula (11).

$$L2'(x,y) = L3(x,y) + \text{Func}(L2(x,y) - L3(x,y)) \quad (11)$$

Accordingly, a post-corrected spatial average L2' (x, y) in the medium area is obtained using the formula (1) to the formula (8) or using the formula (1) to the formula (5) and the formula (9) to the formula (11).

Subsequently, the difference value R2 (x, y) between the spatial average L2 (x, y) in the medium area and the post-correction spatial average (L2' (x, y)) in the medium area is calculated according to a formula (12). That is, the R2 (x, y) represents a correction amount for correcting the L2 (x, y). Further, a signal is extracted from the R2 (x, y) based on a function $F_{resid}$ according to a formula (13) to be synthesized with the L2' (x, y). As a result, the re-correction spatial average L2" (x, y) in the medium area is obtained.

$$R2(x,y) = L2(x,y) - (x,y) \quad (12)$$

$$L2''(x,y) = L2' + F_{resid}(R2(x,y), E3(x,y), \alpha 1, \alpha 2, hi3, lo3) \quad (13)$$

An example of the function $F_{resid}$ in the formula (13) is shown in the following formula (14).

$$F_{resid}(r, e, \alpha 1, \alpha 2, hi, lo) = \quad (14)$$

$$\begin{cases} \alpha 2 \times r & \text{if } e > hi \\ \alpha 1 \times r & \text{else if } e < lo \\ \left((\alpha 2 - \alpha 1) \times \frac{e - lo}{hi - lo} + \alpha 1\right) \times r & \text{else} \end{cases}$$

Figure 4:
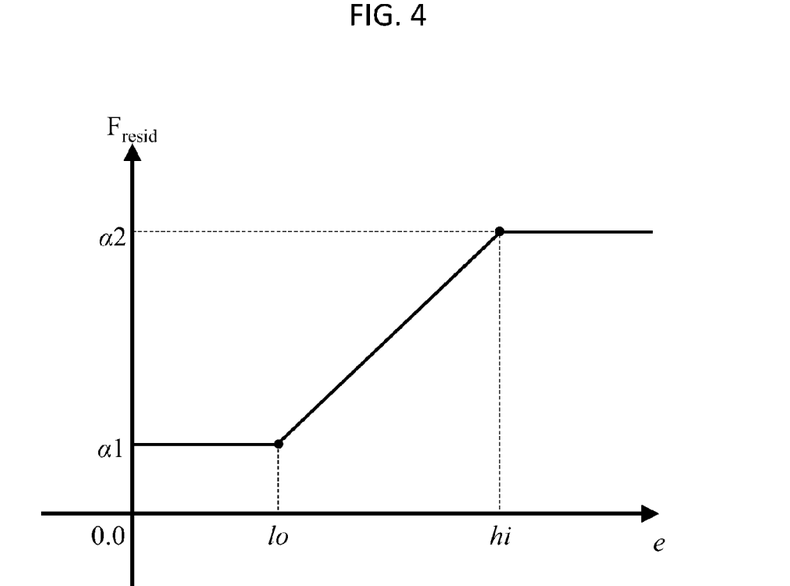
FIG. 4 is an exemplary graph illustrating a form of a recorrection function according to the present embodiment.

It is provided that α1<=α2 and, basically, 0.0<=α1<=α2<=1.0. More specifically, according to the formula (14), in a case where the target pixel is included in an edge (E3 (x, y)>hi3), values are extracted from the difference value R2 (x, y) at high rates. This contributes to minimization of the final correction amount, resulting in achieving prevention of loss of edge. Further, in a case where the target pixel is included in a flat area (E3 (x, y)<lo3), values are extracted from the difference value R2 (x, y) at low rates. This contributes to preservation of the final correction amount of a large value, resulting in preserving the noise rejection performance in the flat area. Still further, in a case where the target pixel is included in a texture area, values are extracted from the difference value R2 (x, y) in proportion to an edge amount of a target area. This ensures preservation of resolution feeling as well as removal of noise. In the formula (14), a relationship between an edge amount (e) and an output of the function $F_{resid}$ in a case where a r of the function $F_{resid}$ satisfies r=1 is illustrated in FIG. 4.

Meanwhile, α1 and α2 in the formula (13) may be varied at each layer or may be common to all the layers.

The function $F_{resid}$ is not limited to the formula (14). It is possible to employ, for example, the following formula (15) or formula (16).

$$F_{resid}(r, e, \alpha 1, \alpha 2, hi, lo) = \quad (15)$$

$$\begin{cases} \alpha 2 \times r & \text{if } e > hi \\ \alpha 1 \times \frac{e}{lo} \times r & \text{else if } e < lo \\ \left((\alpha 2 - \alpha 1) \times \frac{e - lo}{hi - lo} + \alpha 1\right) \times r & \text{else} \end{cases}$$

$$F_{resid}(r, e, \alpha 2, hi) = \begin{cases} \alpha 2 \times r & \text{if } e > hi \\ \alpha 2 \times \frac{e}{hi} \times r & \text{otherwise} \end{cases} \quad (16)$$

Figure 5:
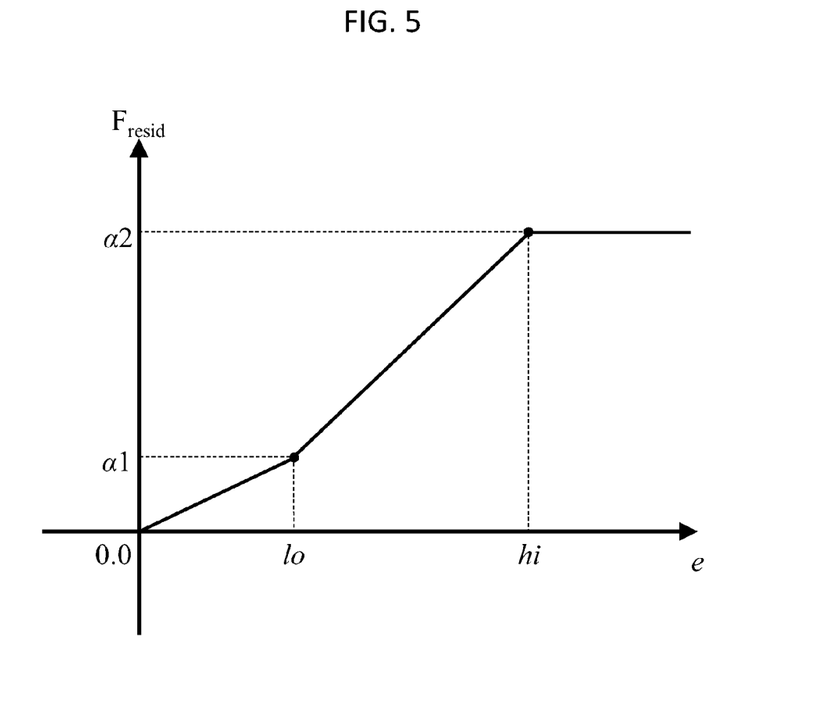
FIG. 5 is an exemplary graph illustrating another form of the recorrection function according to the present embodiment.
Figure 6:
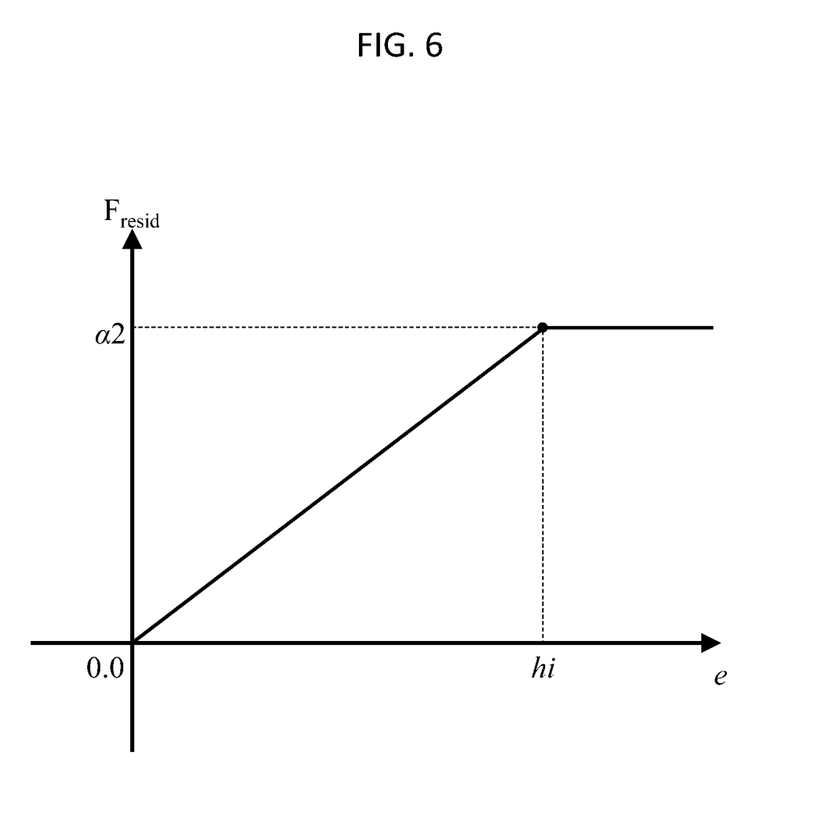
FIG. 6 is an exemplary graph illustrating further another form of the recorrection function according to the present embodiment.

In the formula (15) and the formula (16), a relationship between the edge amount (e) and the output of the function $F_{resid}$ in a case where the r of the function $F_{resid}$ satisfies r=1 is illustrated in FIG. 5 and FIG. 6.

Further, substitution of the formula (13) with the following formula (17) will also be able to produce an equivalent effect.

$$L2''(x,y) = L2'(x,y) + F_{resid}(L2(x,y) - L2'(x,y), \lambda') \quad (17)$$

Here, the function $F_{resid}$ employs a formula (18) or a formula (19). A sign function in the formula (18) is a function for outputting a code of input, and λ' in the formula (18) and the formula (19) is represented by a formula (20).

$$F_{Resid}(r, \lambda') = \begin{cases} \text{sign}(r) \times (|r| - \lambda', 0) & \text{if } |r| > \lambda' \\ 0 & \text{otherwise} \end{cases} \quad (18)$$

$$F_{Resid}(r, \lambda') = \begin{cases} r & \text{if } |r| > \lambda' \\ 0 & \text{otherwise} \end{cases} \quad (19)$$

$$\lambda' = \begin{cases} \alpha 2 \times \lambda & \text{if } e > hi \\ \alpha 1 \times \lambda & \text{else if } e < lo \\ \left((\alpha 2 - \alpha 1) \times \frac{e - lo}{hi - lo} + \alpha 1\right) \times \lambda & \text{else} \end{cases} \quad (20)$$

Here, λ of the formula (20) is a preliminary set value. Also, thresholds hi and lo and parameters α1 and α2 may be varied, as similar to the cases of the formulas (14), (15), and (16), at each layer, or may be common to all the layers.

Also, λ' should not be limited to the formula (20), but is substitutable as similar to the cases of the formula (15) and the formula (16) with respect to the formula (14).

As described above, in the first embodiment, control of the recorrection amount in noise rejection is performed based on the edge information. Use of the image processing method according to the embodiment contributes to preservation of the noise rejection performance in the flat area where noise is easily noticeable as well as improvement of resolution feeling of the edge area and/or the texture area.

Next, an image processing device according to the embodiment of the present invention will be described.

Figure 7:
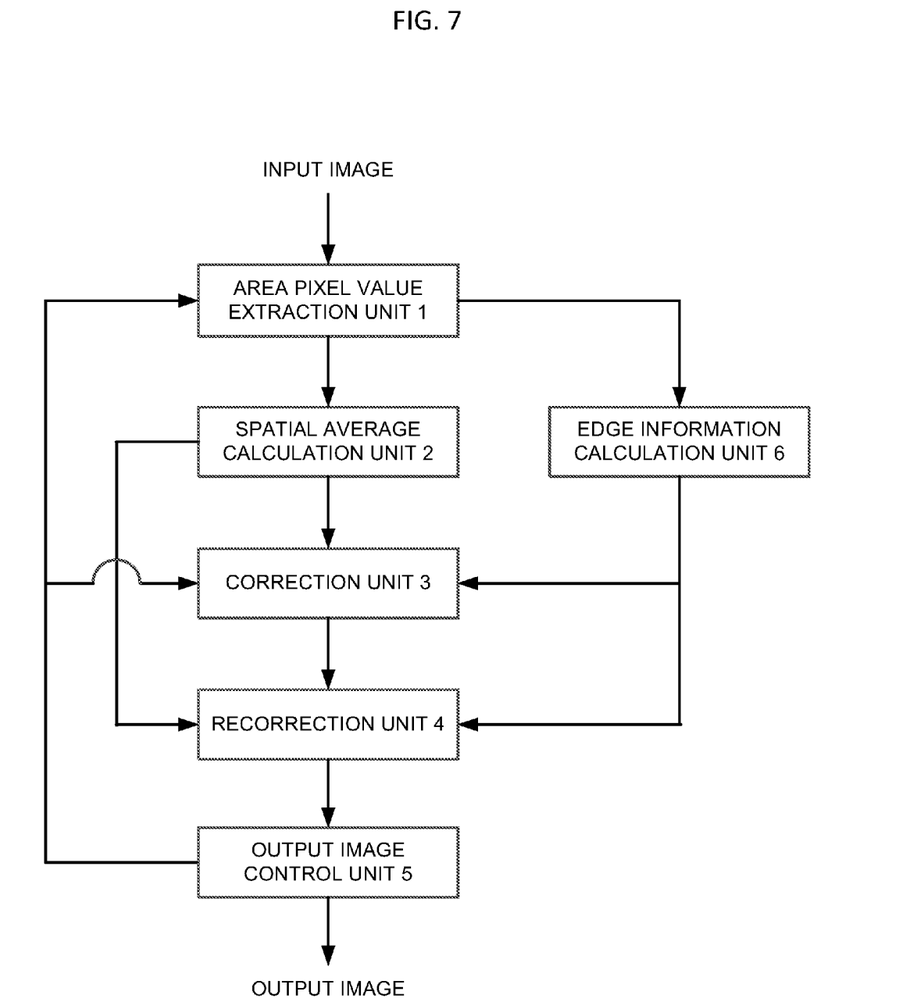
FIG. 7 is a block diagram illustrating an image processing device according to the present embodiment.

FIG. 7 is a block diagram illustrating an image processing device according to the embodiment of the present invention.

A first embodiment includes a method for obtaining the correction value using the formula (1) to the formula (8) and a method for obtaining the correction value using the formula (1) to the formula (5) and the formula (9) to the formula (11).

FIG. 7 illustrates an image processing device that obtains the correction value using the formula (1) to the formula (8).

The image processing device according to the present embodiment of FIG. 7 includes an area pixel value extraction unit 1, a spatial average calculation unit 2, a correction unit 3, a recorrection unit 4, an output image control unit 5, and an edge information calculation unit 6.

The area pixel value extraction unit 1 extracts the pixel values of pixels in the wide area, the pixel values of pixels in the medium area, the pixel values of pixels in the narrow area, and the pixel value of the input pixel value $P_{in}$ (x, y) (target pixel) at their respective timings, each area including the pixel location (x, y) (target pixel) at a center thereof. Then, the area pixel value extraction unit 1 outputs the resulting values to the spatial average calculation unit 2 and the edge information calculation unit 6, respectively.

The spatial average calculation unit 2 receives the pixel values of each area from the area pixel value extraction unit 1 to calculate the special average for each area. The spatial average calculation unit 2 outputs the calculated spatial average of each of the wide area, the medium area, and the narrow area to the correction unit 3 and the recorrection unit 4, respectively.

The edge information calculation unit 6 calculates the edge amount E3 (x, y) in the wide area based on the pixel values of pixels existing in the wide area, the pixel values being from the area pixel value extraction unit 1. The edge information calculation unit 6 calculates the edge amount in the following manner. The edge information calculation unit 6 calculates the edge amount EV3 (x, y) in the vertical direction and the edge amount EH3 (x, y) in the horizontal direction according to the formula (3) and the formula (4), respectively, and adds the resulting values according to the formula (5) to obtain the edge amount E3 (x, y) in the wide area. The edge information calculation unit 6 calculates the edge amount E2 (x, y) of the medium area and an edge amount E1 (x, y) of the narrow area in a similar manner. Meanwhile, the edge amount in the horizontal direction and the edge amount in the vertical direction are calculated here. However, the edge amount in an oblique direction may be calculated for the use here.

The correction unit 3 corrects the spatial average L3 (x, y) in the wide area according to the formula (6) using the composed weight α3 (x, y) obtainable from the edge amount E3 (x, y) that was calculated by the edge information calculation unit 6, thereby calculating the post-correction spatial average L3" (x, y) of the wide area. Meanwhile, the composed weight α3 (x, y) is calculated according to the formula (7) using the preliminary set thresholds hi3 and lo3.

Further, the correction unit 3 corrects the spatial average L2 (x, y) of the medium area according to the formula (8) using the calculated spatial average L3" (x, y), thereby obtaining the post-correction spatial average L2' (x, y). The correction unit 3 makes similar corrections with respect to the spatial average L1 (x, y) and the input pixel value $P_{in}$ (x, y).

The recorrection unit 4 calculates a difference value between the pre-correction spatial average L2 (x, y) and the post-correction spatial average L2' (x, y). Then, the recorrection unit 4 recorrects the L2' (x, y) according to the formula (17) based on the edge amount E3 (x, y) that was calculated by the edge information calculation unit 6 to obtain the post-recorrection spatial average L2" (x, y). The recorrection unit 4 also recorrects a post-correction spatial average L1' (x, y) and a post-correction input pixel value $P_{in}$' (x, y) in a similar manner.

The output image control unit 5 instructs the area pixel value extraction unit 1 to extract pixel values of pixels of an area of the next layer every time when the post-correction spatial averages are sequentially input. Also, every time when the post-recorrection spatial average is input, the output image control unit 5 feeds back the input value to the correction unit 3. Then, when the $P_{out}$ (x, y) of a single pixel is input, the output image control unit 5 outputs the $P_{out}$ (x, y) as an output pixel value.

Figure 8:
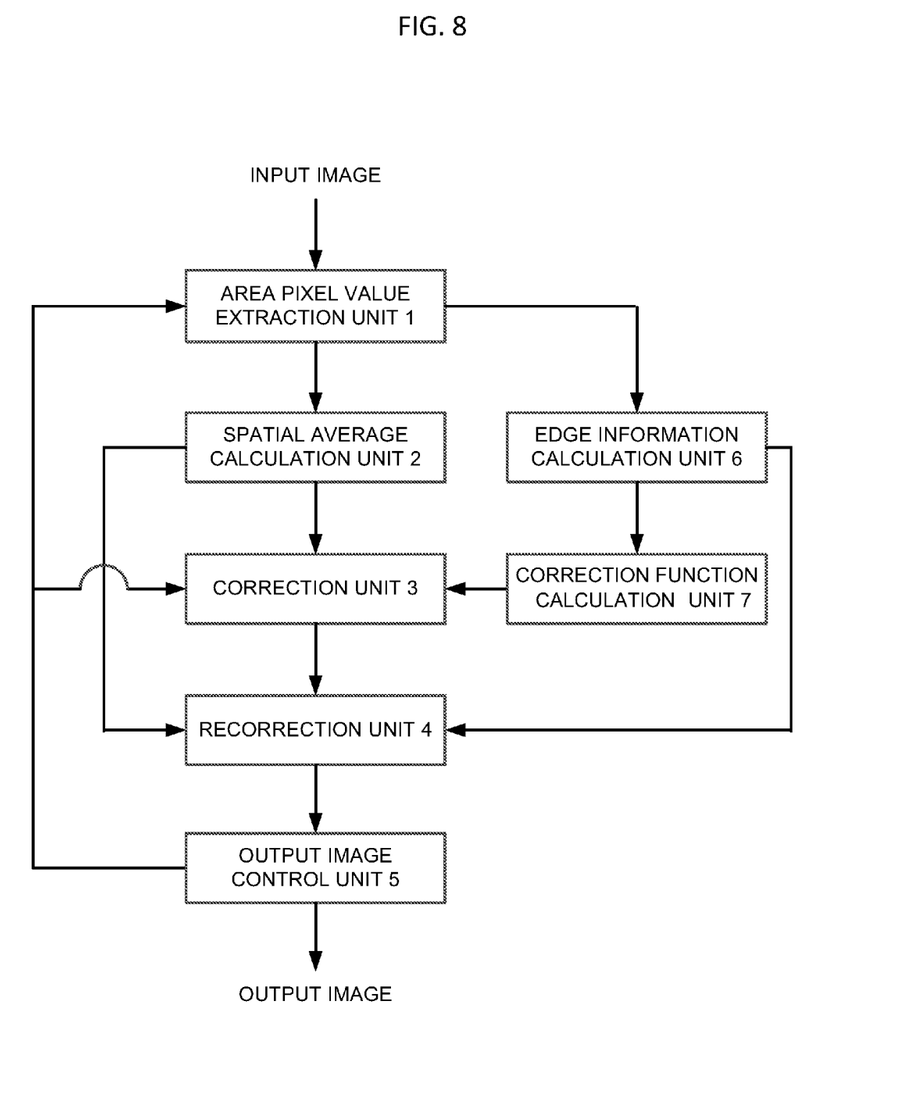
FIG. 8 is a block diagram illustrating another image processing device according to the present embodiment.

Subsequently, FIG. 8 illustrates another image processing device according to the embodiment of the present invention that obtains the correction values using the formula (1) to the formula (5) and the formula (9) to the formula (11).

The image processing device according to the embodiment of the present invention illustrated in FIG. 8 includes the area pixel value extraction unit 1, the spatial average calculation unit 2, the correction unit 3, the recorrection unit 4, the output image control unit 5, the edge information calculation unit 6, and a correction function calculation unit 7.

The area pixel value extraction unit 1, the spatial average calculation unit 2, the recorrection unit 4, the output image control unit 5, and the edge information calculation unit 6 operate in a manner similar to those of the image processing device according to the first embodiment of FIG. 7.

The correction function calculation unit 7 calculates the parameter (a) in the Func function (correction function) according to the formula (9) and the formula (10) based on the edge amount that was calculated by the edge information calculation unit 6. Then, the correction function calculation unit 7 determines the Func function (correction function) for each layer.

The correction unit 3 corrects the spatial average for each layer using the Func function (correction function) of each layer that was determined by the correction function calculation unit 7.

As described above, according to the embodiment of the present invention, control of the recorrection amount in the noise suppression based on the edge information ensures preservation of the noise rejection performance in the flat area where noise is easily noticeable as well as improvement of the resolution feeling of the edge area and/or the texture area.

Meanwhile, as apparent from the above description, it is possible to configure each unit with hardware, and it is also possible to achieve the same function with a computer program. In this case, a processor operated by a program that is stored in a program memory realizes a function and an operation equivalent to those of each embodiment described above. Alternatively, it is also possible to realize only a portion of the function of the above described embodiment by the computer program.

The above embodiments can be described partially or in whole according to the following supplementary notes. However, the present invention should not be limited to the following supplementary notes.

(Supplementary note 1) An image processing method including:

calculating a pixel statistical value and edge information of pixels for each of areas of a multi-layer, the areas each containing a target pixel and having a successively decreased range;

correcting difference information between a pixel statistical value of an area of a specific layer and a pixel statistical value of an area of a layer that is wider than the area of the specific layer using the edge information;

correcting the pixel statistical value of the area of the specific layer using post-correction difference information and the pixel statistical value of the area that is wider than the area of the specific layer;

recorrecting difference information between a pre-correction pixel statistical value of the area of the specific layer and a post-correction pixel statistical value of the area of the specific layer using the edge information; and correcting the target pixel by repeating correction and recorrection of the pixel statistical value of the area of the specific layer successively in each layer until the area reduces its range from the maximum range to the minimum range.

(Supplementary note 2) The image processing method according to supplementary note 1, wherein the recorrection is performed in such a manner that:

a correction amount is set to a small value when the target pixel is contained in an edge;

the correction amount is set to a large value when the target pixel is contained in a flat area; and the correction amount is set according to the edge information when the target pixel is contained in a texture area.

(Supplementary note 3) The image processing method according to supplementary note 1 or supplementary note 2, wherein the difference information is determined using the pixel statistical value of the area of the specific layer, the pixel statistical value of the area of the layer that is wider than the area of the specific layer, and the edge information in the area of the layer that is wider than the area of the specific layer.

(Supplementary note 4) The image processing method according to supplementary note 3, wherein the pixel statistical value of the specific layer is not corrected when the edge information in the area of the layer that is wider than the area of the specific layer exceeds a predetermined threshold.

(Supplementary note 5) The image processing method according to any one of supplementary note 1 to supplementary note 4, wherein a degree of correction is varied for each layer when the pixel statistical value of the area of the specific layer is corrected using post-correction difference information and the pixel statistical value of the area that is wider than the area of the specific layer.

(Supplementary note 6) The image processing method according to supplementary note 5, wherein the degree of correction is varied according to variation amounts of pixel values caused by noise of the area of the specific layer when the pixel statistical value of the area of the specific layer is corrected using the post-correction difference information and the pixel statistical value of the area that is wider than the area of the specific layer.

(Supplementary note 7) The image processing method according to supplementary note 5, wherein the degree of correction is varied according to an edge amount of the area that is wider than the area of the specific layer when the pixel statistical value of the area of the specific layer is corrected using the post-correction difference information and the pixel statistical value of the area that is wider than the area of the specific layer.

(Supplementary note 8) The image processing method according to any one of supplementary note 1 to supplementary note 7, wherein the correction is performed in such a manner that a value close to zero is output as the difference information comes closer to zero, whereas, the degree of correction is made smaller as the difference information becomes larger when the pixel statistical value of the area of the specific layer is corrected using the post-correction difference information and the pixel statistical value of the area that is wider than the area of the specific layer.

(Supplementary note 9) The image processing method according to any one of supplementary note 1 to supplementary note 8, wherein a spatial average of pixels is used as the pixel statistical value.

(Supplementary note 10) The image processing method according to supplementary note 9, wherein the spatial average value is any one of an arithmetic mean, a geometric mean, or a weighted average efficiency of pixels.

(Supplementary note 11) An image processing device including:

a pixel statistical value calculation unit calculating a pixel statistical value of pixels for each of areas of a multi-layer, the areas each containing a target pixel and having a successively decreased range;

an edge information calculation unit calculating edge information for each of the areas of the multi-layer, the areas each containing a target pixel and having a successively decreased range; and a correction unit correcting a pixel statistical value of an area of a specific layer using post-correction difference information and a pixel statistical value of an area that is wider than the area of the specific layer, recorrecting difference information between a pre-correction pixel statistical value of the area of the specific layer and a post-correction pixel statistical value of the area of the specific layer using the edge information, and correcting the target pixel by repeating correction and recorrection of the pixel statistical value of the area of the specific layer successively in each layer until the area reduces its range from the maximum range to the minimum range.

(Supplementary note 12) The image processing device according to supplementary note 11, wherein the correction unit performs correction in such a manner that a correction amount is set to a small value when the target pixel is contained in an edge;

the correction amount is set to a large value when the target pixel is contained in a flat area; and the correction amount is set according to the edge information when the target pixel is contained in a texture area.

(Supplementary note 13) The image processing device according to supplementary note 11 or supplementary note 12, wherein the correction unit determines the difference information using the pixel statistical value of the area of the specific layer, the pixel statistical value of the area of a layer that is wider than the area of the specific layer, and the edge information in the area of the layer that is wider than the area of the specific layer.

(Supplementary note 14) The image processing device according to supplementary note 13, wherein the correction unit does not correct the pixel statistical value of the specific layer when the edge information in the area of the layer that is wider than the area of the specific layer exceeds a predetermined threshold.

(Supplementary note 15) The image processing device according to any one of supplementary note 11 to supplementary note 14, wherein the correction unit causes the degree of correction to vary for each layer when the pixel statistical value of the area of the specific layer is corrected using post-correction difference information and the pixel statistical value of the area that is wider than the area of the specific layer.

(Supplementary note 16) The image processing device according to supplementary note 15, wherein the correction unit causes the degree of correction to vary according to variation amounts of pixel values caused by noise of the area of the specific layer when the pixel statistical value of the area of the specific layer is corrected using the post-correction difference information and the pixel statistical value of the area that is wider than the area of the specific layer.

(Supplementary note 17) The image processing device according to supplementary note 15, wherein the correction unit causes the degree of correction to vary according to an edge amount of the area that is wider than the area of the specific layer when the pixel statistical value of the area of the specific layer is corrected using the post-correction difference information and the pixel statistical value of the area that is wider than the area of the specific layer.

(Supplementary note 18) The image processing device according to any one of supplementary note 11 to supplementary note 17, wherein the correction unit performs correction in such a manner that a value close to zero is output as the difference information comes closer to zero, whereas, the degree of correction is made smaller as the difference information becomes larger, when the pixel statistical value of the area of the specific layer is corrected using the post-correction difference information and the pixel statistical value of the area that is wider than the area of the specific layer.

(Supplementary note 19) The image processing device according to any one of supplementary note 11 to supplementary note 18, wherein a spatial average of pixels is used as the pixel statistical value.

(Supplementary note 20) The image processing device according to supplementary note 19, wherein the spatial average value is any one of an arithmetic mean, a geometric mean, or a weighted average efficiency of pixels.

(Supplementary note 21) A program causing a computer to execute:

pixel statistical value calculation processing for calculating a pixel statistical value of pixels for each of areas of a multi-layer, the areas each containing a target pixel and having a successively decreased range;

edge information calculation processing for calculating edge information for each of the areas of the multi-layer, the areas each containing a target pixel and having a successively decreased range; and correction processing for correcting a pixel statistical value of an area of a specific layer using post-correction difference information and a pixel statistical value of an area that is wider than the area of the specific layer, recorrecting difference information between a pre-correction pixel statistical value of the area of the specific layer and a post-correction pixel statistical value of the area of the specific layer using the edge information, and correcting the target pixel by repeating correction and recorrection of the pixel statistical value of the area of the specific layer successively in each layer until the area reduces its range from the maximum range to the minimum range.

(Supplementary note 22) The program according to supplementary note 21, wherein, in the correction processing, the correction is performed in such a manner that:

a correction amount is set to a small value when the target pixel is contained in an edge;

the correction amount is set to a large value when the target pixel is contained in a flat area; and the correction amount is set according to the edge information when the target pixel is contained in a texture area.

(Supplementary note 23) The program according to supplementary note 21 or supplementary note 22, wherein, in the correction processing, the difference information is determined using the pixel statistical value of the area of the specific layer, the pixel statistical value of the area of a layer that is wider than the area of the specific layer, and edge information in the area of the layer that is wider than the area of the specific layer.

(Supplementary note 24) The program according to supplementary note 23, wherein, in the correction processing, the pixel statistical value of the specific layer is not corrected when the edge information in the area of the layer that is wider than the area of the specific layer exceeds a predetermined threshold.

(Supplementary note 25) The program according to any one of supplementary note 11 to supplementary note 14, wherein, in the correction processing, a degree of correction is varied for each layer when the pixel statistical value of the area of the specific layer is corrected using the post-correction difference information and the pixel statistical value of the area that is wider than the area of the specific layer.

(Supplementary note 26) The program according to supplementary note 25, wherein, in the correction processing, the degree of correction is varied according to variation amounts of pixel values caused by noise in the area of the specific layer when the pixel statistical value of the area of the specific layer is corrected using the post-correction difference information and the pixel statistical value of the area that is wider than the area of the specific layer.

(Supplementary note 27) The program according to supplementary note 25, wherein, in the correction processing, the degree of correction is varied according to an edge amount of the area that is wider than the area of the specific layer when the pixel statistical value of the area of the specific layer is corrected using the post-correction difference information and the pixel statistical value of the area that is wider than the area of the specific layer.

(Supplementary note 28) The program according to any one of supplementary note 21 to supplementary note 27, wherein, in the correction processing, correction is performed in such a manner that a value close to zero is output as the difference information comes closer to zero, whereas, the degree of correction is made smaller as the difference information becomes larger, when the pixel statistical value of the area of the specific layer is corrected using the post-correction difference information and the pixel statistical value of the area that is wider than the area of the specific layer.

(Supplementary note 29) The program according to any one of supplementary note 21 to supplementary note 28, wherein a spatial average of pixels is used as the pixel statistical value.

(Supplementary note 30) The program according to supplementary note 29, wherein the spatial average value is any one of an arithmetic mean, a geometric mean, or a weighted average efficiency of pixels.

The present invention has been described above with reference to the preferred embodiments and examples. The present invention, however, is not always limited to the above embodiments and examples, but may be modified to be carried out in various forms without departing from the technical concept of the present invention.

This application claims the benefit of Japanese Application No. 2012-100910, filed Apr. 26, 2012, the disclosure of which is hereby incorporated by reference.

REFERENCE SIGNS LIST 1 area pixel value extraction unit
2 spatial average calculation unit
3 correction unit
4 recorrection unit
5 output image control unit
6 edge information calculation unit
7 correction function calculation unit

The invention claimed is:

1. An image processing method comprising:
  calculating a pixel statistical value and edge information of pixels for each of areas of a multi-layer, the areas each containing a target pixel and having a successively decreased range;
  correcting difference information between the pixel statistical value of an area of a specific layer and the pixel statistical value of an area of a layer that is wider than the area of the specific layer using the edge information of the area of the layer that is wider than the area of the specific layer;
  correcting the pixel statistical value of the area of the specific layer using post-correction difference information and the pixel statistical value of the area of the layer that is wider than the area of the specific layer;
  recorrecting the post-correction pixel statistical value of the area of the specific layer using difference information between a pre-correction pixel statistical value of the area of the specific layer and the post-correction pixel statistical value of the area of the specific layer and the edge information of the area of the layer that is wider than the area of the specific layer; and
  correcting the target pixel by repeating correction and recorrection of the pixel statistical value of the area of the specific layer successively in each layer until the area reduces its range from the maximum range to the minimum range.

2. The image processing method according to claim 1, wherein the recorrection is performed in such a manner that:
  a correction amount is set to a small value when the target pixel is included in an edge;
  the correction amount is set to a large value when the target pixel is included in a flat area; and
  the correction amount is set according to the edge information when the target pixel is included in a texture area.

3. The image processing method according to claim 1, wherein the difference information is determined using the pixel statistical value of the area of the specific layer, the pixel statistical value of the area of the layer that is wider than the area of the specific layer, and the edge information in the area of the layer that is wider than the area of the specific layer.

4. The image processing method according to claim 3, wherein the pixel statistical value of the specific layer is not corrected when the edge information in the area of the layer that is wider than the area of the specific layer exceeds a predetermined threshold.

5. The image processing method according to claim 1, wherein a degree of correction is varied for each layer when the pixel statistical value of the area of the specific layer is corrected using post-correction difference information and the pixel statistical value of the area that is wider than the area of the specific layer.

6. The image processing method according to claim 5, wherein the degree of correction is varied according to variation amounts of pixel values caused by noise of the area of the specific layer when the pixel statistical value of the area of the specific layer is corrected using the post-correction difference information and the pixel statistical value of the area that is wider than the area of the specific layer.

7. The image processing method according to claim 5, wherein the degree of correction is varied according to an edge amount of the area that is wider than the area of the specific layer when the pixel statistical value of the area of the specific layer is corrected using the post-correction difference information and the pixel statistical value of the area that is wider than the area of the specific layer.

8. The image processing method according to claim 1, wherein the correction is performed in such a manner that a value close to zero is output as the difference information comes closer to zero, whereas, the degree of correction is made smaller as the difference information becomes larger when the pixel statistical value of the area of the specific layer is corrected using the post-correction difference information and the pixel statistical value of the area that is wider than the area of the specific layer.

9. An image processing device comprising:
  a pixel statistical value calculation unit calculating a pixel statistical value of pixels for each of areas of a multi-layer, the areas each containing a target pixel and having a successively decreased range;
  an edge information calculation unit calculating edge information for each of the areas of the multi-layer, the areas each containing a target pixel and having a successively decreased range; and
  a correction unit correcting difference information between the pixel statistical value of an area of a specific layer and the pixel statistical value of an area of the layer that is wider than the area of the specific layer using the edge information of the area of the layer that is wider than the area of the specific layer, correcting the pixel statistical value of the area of the specific layer using post-correction difference information and the pixel statistical value of the area of the layer that is wider than the area of the specific layer, recorrecting the post-correction pixel statistical value of the area of the specific layer using difference information between a pre-correction pixel statistical value of the area of the specific layer and the post-correction pixel statistical value of the area of the specific layer and the edge information of the area of the layer that is wider than the area of the specific layer, and correcting the target pixel by repeating correction and recorrection of the pixel statistical value of the area of the specific layer successively in each layer until the area reduces its range from the maximum range to the minimum range.

10. The image processing device according to claim 9, wherein the correction unit performs correction in such a manner that:
   a correction amount is set to a small value when the target pixel is contained in an edge;
   the correction amount is set to a large value when the target pixel is contained in a flat area; and
   the correction amount is set according to the edge information when the target pixel is contained in a texture area.

11. The image processing device according to claim 9, wherein the correction unit determines the difference information using the pixel statistical value of the area of the specific layer, the pixel statistical value of the area of a layer that is wider than the area of the specific layer, and the edge information in the area of the layer that is wider than the area of the specific layer.

12. The image processing device according to claim 11, wherein the correction unit does not correct the pixel statistical value of the specific layer when the edge information in the area of the layer that is wider than the area of the specific layer exceeds a predetermined threshold.

13. The image processing device according to claim 9, wherein the correction unit causes the degree of correction to vary for each layer when the pixel statistical value of the area of the specific layer is corrected using post-correction difference information and the pixel statistical value of the area that is wider than the area of the specific layer.

14. The image processing device according to claim 13, wherein the correction unit causes the degree of correction to vary according to variation amounts of pixel values caused by noise of the area of the specific layer when the pixel statistical value of the area of the specific layer is corrected using the post-correction difference information and the pixel statistical value of the area that is wider than the area of the specific layer.

15. The image processing device according to claim 13, wherein the correction unit causes the degree of correction to vary according to an edge amount of the area that is wider than the area of the specific layer when the pixel statistical value of the area of the specific layer is corrected using the post-correction difference information and the pixel statistical value of the area that is wider than the area of the specific layer.

16. The image processing device according to claim 9, wherein the correction unit performs correction in such a manner that a value close to zero is output as the difference information comes closer to zero, whereas, the degree of correction is made smaller as the difference information becomes larger, when the pixel statistical value of the area of the specific layer is corrected using the post-correction difference information and the pixel statistical value of the area that is wider than the area of the specific layer.

17. The image processing device according to claim 9, wherein a spatial average of pixels is used as the pixel statistical value.

18. The image processing device according to claim 17, wherein the spatial average value is any one of an arithmetic mean, a geometric mean, or a weighted average efficiency of pixels.

19. A non-transitory computer readable storage medium storing a program causing a computer to execute:
   pixel statistical value calculation processing for calculating a pixel statistical value of pixels for each of areas of a multi-layer, the areas each containing a target pixel and having a successively decreased range;
   edge information calculation processing for calculating edge information for each of the areas of the multi-layer, the areas each containing a target pixel and having a successively decreased range; and
   correction processing for correcting difference information between the pixel statistical value of an area of a specific layer and the pixel statistical value of an area of a layer that is wider than the area of the specific layer using the edge information of the area of the layer that is wider than the area of the specific layer, correcting the pixel statistical value of the area of the specific layer using post-correction difference information and the pixel statistical value of the area of the layer that is wider than the area of the specific layer, recorrecting the post-correction pixel statistical value of the area of the specific layer using difference information between a pre-correction pixel statistical value of the area of the specific layer and the post-correction pixel statistical value of the area of the specific layer and the edge information of the area of the layer that is wider than the area of the specific layer, and correcting the target pixel by repeating correction and recorrection of the pixel statistical value of the area of the specific layer successively in each layer until the area reduces its range from the maximum range to the minimum range.

* * * * *